United States Patent
Di Lullo Arias et al.

(10) Patent No.: US 7,137,448 B2
(45) Date of Patent: Nov. 21, 2006

(54) METHOD OF CEMENTING A WELL USING COMPOSITION CONTAINING ZEOLITE

(75) Inventors: Gino F. Di Lullo Arias, Rio de Janeiro (BR); Philip James Rae, Singapore (SG)

(73) Assignee: BJ Services Company, Houston, TX (US)

( * ) Notice: Subject to any disclaimer, the term of this patent is extended or adjusted under 35 U.S.C. 154(b) by 203 days.

(21) Appl. No.: 10/744,978

(22) Filed: Dec. 22, 2003

(65) Prior Publication Data

US 2005/0133222 A1   Jun. 23, 2005

(51) Int. Cl.
*E21B 33/13*   (2006.01)

(52) U.S. Cl. ..................................... 166/292
(58) Field of Classification Search ............... 166/292
See application file for complete search history.

(56) References Cited

U.S. PATENT DOCUMENTS

| | | | |
|---|---|---|---|
| 4,448,599 A * | 5/1984 | Mackenzie et al. ........... 65/21.4 |
| 5,421,409 A | 6/1995 | Mueller et al. |
| 5,447,197 A | 9/1995 | Rae et al. |
| 5,547,024 A | 8/1996 | Di Lullo Arias |
| 5,547,506 A | 8/1996 | Rae et al. |
| 5,613,558 A | 3/1997 | Dillenbeck, III |
| 6,145,591 A | 11/2000 | Boncan et al. |
| 6,173,778 B1 | 1/2001 | Rae et al. |
| 6,230,804 B1 | 5/2001 | Mueller et al. |
| 6,457,524 B1 | 10/2002 | Roddy |
| 6,494,951 B1 | 12/2002 | Reddy et al. |
| 6,964,302 B1 * | 11/2005 | Luke et al. .................. 166/293 |
| 2004/0107877 A1 * | 6/2004 | Getzlaf et al. .............. 106/813 |
| 2004/0262000 A1 * | 12/2004 | Morgan et al. ............. 166/293 |

* cited by examiner

*Primary Examiner*—David Bagnell
*Assistant Examiner*—Nicole Coy
(74) *Attorney, Agent, or Firm*—Jones & Smith, LLP; John Wilson Jones

(57) ABSTRACT

A cementitious composition for cementing an oil or gas well and which exhibits, when cured, increased flexural strength and a flexural strength to compressive strength ratio between from about 0.29 to about 0.80, contains a hydraulically-active cementitious material, such as Portland cement, and substantially spherical zeolite. Representative zeolites include natrolite, heulandite, analcime, chabazite, stilbite, and clinoptilolite. The weight percent of zeolite in the cement composition is generally less than or equal to 15 percent. In practice, a well bore may be cemented by pumping the activated slurry and pumping it within the well bore to a pre-selected location and allowing it to solidify.

34 Claims, No Drawings

METHOD OF CEMENTING A WELL USING COMPOSITION CONTAINING ZEOLITE

FIELD OF THE INVENTION

The invention relates to cementitious compositions and to methods of using such compositions for cementing oil and gas wells.

BACKGROUND OF THE INVENTION

During construction of oil and gas wells, a rotary drill is typically used to bore through subterranean formations of the earth to form a borehole. As the rotary drill bores through the earth, a drilling fluid, known in the industry as a "mud," is circulated through the borehole. Drilling fluids are usually pumped from the surface through the interior of the drill pipe. By continuously pumping the drilling fluid through the drill pipe, the drilling fluid can be circulated out the bottom of the drill pipe and back up to the well surface through the annular space between the wall of the well bore and the drill pipe. The hydrostatic pressure created by the column of mud in the hole prevents blowouts which would otherwise occur due to the high pressures encountered within the well. The drilling fluid is also used to help lubricate and cool the drill bit and facilitates the removal of cuttings as the borehole is drilled.

Once the well bore has been drilled, casing is lowered into the well bore. A cement slurry is then pumped into the casing and a plug of fluid, such as drilling mud or water, is then pumped behind the cement slurry in order to force the cement up into the annulus between the exterior of the casing and the borehole. The cement slurry is then allowed to set and harden to hold the casing in place. Very low cement compressive strength is required for this purpose; the required compressive strength being dependent on casing and hole diameter. Generally, a compressive strength of 500 psi is sufficient for any combination of hole/casing for a typical oil well.

The cement also provides zonal isolation of the subsurface formations, helps to prevent sloughing or erosion of the well bore and protects the well casing from corrosion from fluids which exist within the well. In this scenario the important factor is the final permeability of the set cement, which is strictly related to the solid content of the slurry and consequently to the compressive strength of the set cement. Thus, to prevent fluid movements, the cement should produce a permeability lower than 0.05 milliDarcies. To achieve this, the minimum water content in the slurry is no greater than around 70% by weight of cement, preferably between about 37% to about 50%. Such water cement ratios typically render a compressive strength higher than 1000 psi/48 hours and usually higher than 2000 PSI in 48 hours depending on the type of cement, curing temperature and other additional components of the slurry.

Typically, hydraulically-active cementitious materials, particularly Portland cements, are used to cement the well casing within the well bore. Hydraulically-active cementitious materials set and develop compressive strength due to the occurrence of a hydration reaction which allows them to set or cure under water. The physical properties of the set cement relate to the crystalline structure of the calcium-silicate-hydrates formed during hydration. For example, conventional Portland cements form an interlocking crystalline network of, for example, tricalcium silicate, dicalcium silicate, tetracalcium aluminum ferrite and calcium hydroxide crystals. These crystals interconnect to form an interlocking crystalline structure which provides both flexural strength and a degree of resiliency.

Typical cement compositions used in the prior art have a flexural strength to compressive strength ratio (FS/CS) of about 0.1 to about 0.25. The strength and durability of the crystalline structure depends largely on the water to cement ratio, porosity of hard set cement to the extent the pores are interconnected, i.e., to what degree permeability is developed.

While the development of cement compositions exhibiting higher flexural strength are desired, it further is desired to develop cement compositions which do not display a corresponding increase in compressive strength. The ability to decouple the flexural strength from compressive strength has applications where high compressive strengths are often not desirable due to low well bore stress conditions or where low compressive strength cements are unable to withstand high well bore stresses, such as deviated wells, gas wells, geothermal wells, steam injection wells and deep wells.

SUMMARY OF THE INVENTION

The invention relates to a cementitious composition for cementing an oil or gas well. The composition, which exhibits improved physical properties, contains a hydraulically-active cementitious material, such as Portland cement, and substantially spherical zeolite. The improved cement exhibits increased flexural strength and less brittleness than neat compositions which do not contain substantially spherical zeolites.

The zeolite is present in the composition in an amount sufficient to increase the flexural strength of the cementitious composition, when cured. The flexural strength to compressive strength ratio (FS/CS) of the cement composition, when cured, is between from about 0.29 to about 0.80 and/or is at least 15% higher than the neat cementitious slurry (defined as the identical inventive cementitious composition without the zeolite).

The compressive strength of the cementitious composition, when cured at 350° F. for 72 hours, is similar (within test accuracy) to the compressive strength of the neat cementitious slurry and preferably 15% lower and more preferably more than 25% lower.

The substantially spherical zeolite is substantially hollow. Preferred zeolites include natrolite, heulandite, analcime, chabazite, stilbite, and clinoptilolite. The weight percent of zeolite in the cement composition is generally less than or equal to 15 percent.

The invention further provides a method for converting drilling fluids to a cementitious material which can be used for oil and gas well cementing operations which has improved flexural strength and decreased brittleness. The cementing method consists of solidifying the aqueous drilling fluid within the borehole of an oil or gas well by adding to it the cementitious composition containing the hydraulically-active cementitious material, substantially spherical zeolite and water so that the slurry is pumpable. The slurry is then activated and pumped within the well bore to a pre-selected location and is allowed to solidify within the well bore.

DETAILED DESCRIPTION OF THE PREFERRED EMBODIMENTS

In cementing the well bore of an oil or gas well, a pumpable slurry is formed of a hydraulically-active cementitious material and zeolite. The slurry is then activated and the activated slurry is then pumped into the well bore. The slurry is then allowed to set up in the well to provide zonal isolation in the well bore.

Hydraulically-active cementitious materials, suitable for use in the cementitious slurry, include materials with hydraulic properties, such as hydraulic cement, slag and blends of hydraulic cement and slag (slagment), which are well known in the art. The term "hydraulic cement" refers to any inorganic cement that hardens or sets due to hydration. As used herein, the term "hydraulically-active" refers to properties of a cementitious material that allow the material to set in a manner like hydraulic cement, either with or without additional activation. Hydraulically-active cementitious materials may also have minor amounts of extenders such as bentonite, gilsonite, and cementitious materials used either without any appreciable sand or aggregate material or admixed with a granular filling material such as sand, ground limestone, the like. Strength enhancers such as silica powder or silica flour can be employed as well. Hydraulic cements, for instance, include Portland cements, aluminous cements, pozzolan cements, fly ash cements, and the like. Thus, for example, any of the oilwell type cements of the class "A–H" as listed in the API Spec 10, (1st ed., 1982), are suitable hydraulic cements. In addition, the cementitious material may include silica sand/flour and/or weighing agents including hematite or barite.

Slagment and Portland cement are preferred cementitious materials. However, both of these materials react quickly with water and set at room temperature unless modified, and they are, therefore, much more difficult to control. The interstitial water of both cement and slagment slurries is also very aggressive, for example, having a high pH. Yet, storable slurries formed from hydraulic cement, especially Portland cement, or slagment have the best overall performance characteristics for well cementing applications.

Zeolites, a group of hydrous aluminosilicate minerals containing sodium, calcium, barium, strontium and potassium, for use in the invention are spherical or substantially spherical and are generally hollow. Such zeolites, upon introduction of water, can swell and are compressible. In light of their elasticity, flexural strength and tensile strength of the hardened cement is increased.

The zeolites for use in the invention are characterized by a rigid three-dimensional crystalline structure, akin to a honeycomb, consisting of a network of interconnected tunnels and cages. As such, the zeolites for use in the invention are hollow. As water is absorbed, it moves freely in and out of the pores, leaving the zeolite framework rigid. Further, the pore and channel sizes of zeolites are nearly uniform, thereby allowing the crystalline structure to act as a molecular sieve. Such zeolites are substantially spherical and further are substantially hollow.

The porous zeolite is host to water molecules and ions of potassium and calcium, as well as a variety of other positively charged ions. However, only those ions of appropriate molecular size which are capable of fitting into the pores are admitted. Thus, the zeolite serves to filter unwanted ions. Further, the zeolites are capable of exchanging cations, i.e., the trading of one charged ion for another on the crystal, and are characterized by a high cation exchange capacity (CEC). Zeolites have high CEC's, arising during the formation of the zeolite from the substitution of an aluminum ion for a silicon ion in a portion of the silicate framework (tetrahedral units that make up the zeolite crystal).

Thus, unlike the flakes, fibers and lamellar type of materials previously used in the art, the spherical zeolites make the cement, when hardened, less brittle, thereby decreasing compressive strength and increasing flexural strength and tensile strength. Further, use of the at least substantially spherical zeolites facilitates the mixing of the cement with water at equivalent solid/liquid ratios used with the flakes, fibers and lamellar materials of the prior art. The zeolites employed in the invention further typically have no chemicals adsorbed onto the surface.

Preferred zeolites include natrolite ($Na_2Al_2Si_8O_{10}.2 H_2O$), heulandite ($(Na, Ca)_{4-6}Al_6(Al, Si)_4Si_{26}O_{72}.24 H_2O$), analcime ($AlSi_2O_6.2 H_2O$), chabazite ($CaAl_2Si_4O_{12}.6 H_2O$), and stilbite ($Ca_2NaAl_5Si_{13}O_{36}.14 H_2O$), clinoptilolite ($AlSi_5O_{12}. 6 H_2O$). Especially preferred is clinoptilolite Clinoptilolite, having a silica to alumina ratio of 5 to 1, and chabazite, having a silica to alumina ratio of 2 to 1, are especially preferred. In such zeolites, the net negative charge within the symmetrical voids hold the cations for the cation exchange capacity (CEC). Ion exchangeable ions, such as potassium, calcium, magnesium and sodium, are held electronically within the open structure (pore space)—up to 38% void space.

The zeolite is present in the composition in an amount sufficient to increase the flexural strength of the cementitious composition, when cured, as compared to the flexural strength of a neat cementitious composition (the cementitious composition void of zeolite), when cured. Typically, the weight percent of zeolite in the composition is less than or equal to 15 percent, preferably less than or equal to 10 percent.

The cementitious slurries of the invention may further contain conventional cement slurry additives, such as suspending agents, dispersants, viscosifiers, suspending agents, defoamers and extending agents. The amount of additive typically is dependent on the type of hydraulically-active cementitious material used and desired density of the slurry. Such additives are typically present in an amount of from 0 to about 5 pounds per barrel of mix water (hydraulically-active cementitious material and water), with about 1 to about 3 pounds per barrel preferred.

Examples of retarders are lignin and sugar derivatives. Defloculents or dispersants to control fluidity include lignosulfonates, naphthalene sulfonates, phenol sulfonates, phosphates, phosphonates, sulfonated styrene maleic anhydride, sulfonated styrene, maleimide, polyacrylates and polymethacrylates. Viscosity reducers include organic acids.

The cementitious slurry of the invention may further contain a suspending agent for maintaining the slurry with minimal separation of the cementitious material. Certain types of suspending agents of the type used in the drilling mud industry can be used for the purposes of the present invention. Suitable suspending/thixotropic agents include welan gum, xanthan gum, cellulose, polyanionic cellulose, xanthan gums, cellulose and derivatives such as carboxymethyl-hydroxyethyl-cellulose, guar and its derivatives, starch and polysaccharides, succinoglycan, polyethylene oxide, bentonite, attapulgite, mixed metal hydroxides, clays such as bentonite and attapulgite, mixed metal hydroxides, oil in water emulsions created with paraffin oil and stabilized with ethoxylated surfactants, poly (methyl vinyl ether/maleic anhydride) decadiene copolymer etc. Preferred as suspending agent are iota carrageenan and poly (methyl vinyl ether/maleic anhydride) decadiene copolymer.

Mixing water containing the optional above-mentioned additives with the dry hydraulically-active cementitious materials produces the slurry. A sufficient amount of water, preferably fresh water, should be added to the hydraulically-active cementitious material to form a liquid slurry of suitable consistency. The amount of water used in forming the cement slurry depends upon the type of hydraulic cement selected and the job conditions at hand. The amount of water used can vary over a wide range, depending upon such factors as the required consistency of the slurry and upon the strength requirement for a particular job.

Depending upon the particular storable slurry, the amount of mixing water in the slurry of the present invention typically ranges from about 30 to 150 weight percent based upon the dry weight of cement and preferably is in the range of about 35 to 90 weight percent. For instance, a slurry with Portland cement should have a density measuring in the range from about 11 to 17.5 lbm/gal and preferably in the range of about 14 to 17.5 lbm/gal, more preferably about 15–16.5 lbm/gal. Slurry densities for slag slurries of about 15 lbm/gal are preferable.

After the slurry is formed, the slurry is activated by the addition of an activator and the slurry is then introduced into the well bore using conventional methods so that the slurry fills the annular space between the casing and the wall of the borehole.

Activators and activation methods as described in U.S. Pat. Nos. 5,447,197 and 5,547,506 may be employed, including "over-activation." Activators are typically added just prior to use of a storable cement slurry. Typical activators include, but are not limited to, solutions of Group IA and IIA hydroxides and carbonates, such as sodium hydroxide (caustic), potassium hydroxide, magnesium hydroxide, calcium hydroxide, sodium carbonate and calcium carbonate; Group IA halides, such as sodium fluoride and KF; ammonium halides, such as ammonium fluoride and ammonium bifluoride (ABF); sulfates, such as sodium sulfate; aluminates, such as sodium aluminate and potassium aluminate; carbonates, such as alkali carbonates, like sodium carbonate; phosphates, such as dibasic alkali phosphates (like dibasic potassium phosphate) and tribasic alkali phosphates (like tribasic potassium phosphate); ammonium phosphates, such as tribasic ammonium phosphate and dibasic ammonium phosphate; silicates; and amines (such as triethanolamine ("TEA"), diethanolamine, etc.. Most typical activators are alkali silicates, such as sodium silicates. For slag slurries a sodium silicate "Crystal 120H", Crosfield, Warrington, England, with a particular silica/soda ratio is especially preferred. Sodium silicate ("Crystal 100S", Crosfield) with a different silica/soda ratio is especially preferred for hydraulic cement and slagment slurries.

Further preferred suspending agents include soda ash, calcium oxide, magnesium oxide, calcium nitrate, calcium nitrite, zinc oxide, zinc carbonate, titanium carbonate and potassium hydroxide.

Upon addition of the activator, the slurry cement, typically being less dense than the drilling fluid, is then introduced downhole into the well bore. Typical concentrations of activator range from 0 to about 8 gallons per barrel ("GPB") of slurry, typically about 1 to about 3 GPB of slurry and are typically added with mix water.

Extra water is preferably added to the slurry during activation. This extra water may be fresh water, sea water or brine. The extra water may contain activator and additional additives, for instance, potassium chloride, dispersants, viscosifiers, liquid suspensions of weighting agents and chemical extending agents.

The activated slurry can be adjusted to the desired density for a particular cementing application. The slurry density can be increased by the addition of a liquid suspension of a weighting agent, such as trimanganese tetraoxide. Lower density slurries can be prepared by adding more water and modifying activator concentrations, if required. Thus, storable slurry "concentrates" can be made in advance and diluted when activated. For example, a 12.5 lbm/gal Portland cement slurry can be prepared by adding 2–3 gallons sodium silicate activator per bbl of slurry and around 38 gallons of additional water per bbl to a storable slurry having the initial density around 15.8 to 16.5 lbm/gal.

Preferably, a pumpable slurry is formed with a measured density ranging from about 11 to about 20 lbm/gal, more preferably in the range of about 14 to about 16 lbm/gal and most preferably about 15 lbm/gal. Although the latter is a lower density than conventional "neat cement", the mechanical properties of the set cement are appropriate for well cementing applications. Furthermore, the volume yield increases and the rheology improves by this slight density reduction.

The activation step may be performed at a location different from that of preparing the cementitious slurry. In other words, the hydraulically-active, cementitious slurry may be formulated at one location, transferred to a second location, activated at the second location, and then pumped into the subterranean formation for cementing.

When cured, the flexural strength to compressive strength ratio (FS/CS) of the cement composition is typically between from about 0.29 to about 0.80. For instance, the compressive strength of the cementitious composition, when cured at 350° F. for 72 hours, is less than or equal to 4,500 psi, preferably less than or equal to 4,000 psi, as compared to approximately 7375 psi produced by a neat cement (i.e., an identical cement without the zeolite) mixed at the same density and tested under the same conditions.

EXAMPLES

The following examples will illustrate the practice of the present invention in its preferred embodiments. A high temperature test was used since the cement, under such conditions, will reach its final mechanical properties within 72 hours. Other embodiments within the scope of the claims herein will be apparent to one skilled in the art from consideration of the specification and practice of the invention as disclosed herein. It is intended that the specification, together with the example, be considered exemplary only, with the scope and spirit of the invention being indicated by the claims which follow.

All parts/percentages are given in terms of weight units except as may otherwise be indicated.

The flexural strength data was generated on a Gilson Company "Model HM-138" Cement Strength Tester. The test apparatus consists of an aluminum frame containing the load transmission, machine controls, and a loading beam positioned at one side of the frames. The flexural strengths were determined using 1.575 by 1.575 by 6.3-in. cement prisms using test methods outlined in ASTM C 348, "Standard Test Method for Flexural Strength of Hydraulic Cement Mortars".

All compressive strength testing was conducted in accordance with API Spec 10, "Specification for Materials and Testing for Well Cements", Jul. 1, 1990.

The zeolite used is commercially available as Doucil A24 from Ineos Silicas and is a hydrated sodium calcium zeolite (clinoptilolite) with an average particle size of 1.1μ This zeolite is resistant to break down under extreme pressures.

Examples 1–5

Storable cementitious slurries were made using Portland cement "Dyckerhoff Class G" (Dyckerhoff Zementwerke, Wiesbaden, Germany) as the cementitious material. The cement was mixed with about 35 percent S-8, a 200–325 mesh silica, 0.5 percent CD-33 cement dispersant, a ketone/acetone formaldehyde condensate, 0.1 percent gallons per sack (gps) of R-21L, a liquid set retarder, 0.01 gallons per cubic feet (gpc) of FP-6L defoamer, and from 0 to 10 by weight of cement (BWOC) zeolite. Comparative Example 1 contains no zeolite. S-8, CD-33, R-21L and FP-6L are all products of BJ Services Company. The density of the cementitious slurry was approximately 15.5 pounds per gallon (ppg) having approximately 47% water by weight of cement.

Table I, below, summarizes the flexural strength and compressive strength testing at 350° F. after 72 hours of each of the formulations.

TABLE I

| Ex. No. | BWOC Zeolite | Flexural Strength | Compressive Strength | FS/CS Ratio |
|---|---|---|---|---|
| 1 | 0.0 | 4000 | 1632.00 | 7375 | 0.22 |
| 2 | 2.5 | 4700 | 1918.37 | 7450 | 0.26 |
| 3 | 5.0 | 3700 | 1510.20 | 2875 | 0.53 |
| 4 | 7.5 | 3750 | 1530.61 | 4000 | 0.38 |
| 5 | 10.0 | 3950 | 1612.24 | 3875 | 0.42 |

As set forth in the results for Example 2, a high compressive strength (7450 psi) was maintained with an associated higher flexural strength value (1918 psi). This characteristic is advantageous where zonal isolation across a high Young's Modulus formation is required. As the amount of zeolite contained in the slurry increases, the compressive strengths fell, but the flexural strengths were similar to those produced with the base cement without the zeolite producing and improvement on the FS/CS ratio. As set forth in Example 2, addition of zeolite above a concentration of 2.5% BWOC produced lower compressive strength than Example 1, but had little appreciable effect on flexural strength. By adjusting the concentration of zeolite from 0 to 15%, the compressive strength of the hardened cement is reduced whereas the flexural strength remains constant or increases.

A great advantage of the invention is the ability to produce variable flexural strength/compressive strength ratios (FS/CS) depending on the zeolite concentration without the necessity for a necessarily high compressive strength. A high FS/CS ratio is advantageous in those well bore conditions where a low Young's Modulus (soft) reservoir formation is present and a minimal Young's Modulus contrast between cement and formation is desired. Examples 3, 4, and 5 all demonstrate slurries having a high FS/CS ratio, ideally suited for soft formation conditions.

From the foregoing, it will be observed that numerous variations and modifications may be effected without departing from the true spirit and scope of the novel concepts of the invention.

What is claimed is:

1. A method of cementng an oil or gas well, comprising
   a. introducing into the well a cementitious composition comprising a hydraulically-active cementitious material, substantially spherical zeolite and water wherein the compressive strength of the cementitious composition, when cured, is equal to or less than the compressive strength of a neat cementitious composition not containing the zeolite; and
   b. allowing the slurry to setup in the well.

2. The method of claim 1, wherein the zeolite is selected from the group consisting of natrolite, heulandite, analcime, chabazite, stilbite, and clinoptilolite.

3. The method of claim 2, wherein the zeolite is clinoptilolite.

4. The method of claim 1, wherein the weight percent of zeolite in the cementitious composition is less than or equal to 15 percent.

5. The method of claim 4, wherein the weight percent of zeolite in the cementitious composition is less than or equal to 10 percent.

6. The method of claim 1, wherein the compressive strength of the cementitious composition, when cured, is at least 15% lower than the compressive strength of the neat cementitious composition.

7. The method of claim 6, wherein the compressive strength of the cementitious slurry, when cured, is at least 25% lower than the compressive strength of the neat cementitious slurry.

8. A method of cementious an oil or gas well comprising
   a. introducing into the well a cementitious composition comprising
      a hydraulically-active cementitious material;
      substantially spherical zeolite; and
      water
   wherein the zeolite is present in the cementitious composition in an amount sufficient to increase the flexural strength of the cementitious composition, when cured, as compared to the flexural strength of a cementitious composition, when cured, which does not contain zeolite; and
   b. allowing the slurry to set up in the well.

9. The method of claim 8, wherein the compressive strength of the cementitious composition, when cured, is equal to or less than the compressive strength of a neat cementitious composition.

10. The method of claim 8, wherein the amount of zeolite in the cementitious composition is less than about 15 weight percent.

11. The method of claim 10, wherein the amount of zeolite in the cementitious composition is less than or equal to about 10 weight percent.

12. The method of claim 8, wherein the flexural strength to compressive strength ratio (FS/CS) of the cementitious composition, when cured, is between from about 0.29 to about 0.80.

13. The method of claim 8, wherein the zeolite is selected from the group consisting of natrolite, heulandite, analcime, chabazite, stilbite, and clinoptilolite.

14. The method of claim 13, wherein the zeolite is clinoptilolite.

15. A method of cementing a section of a well penetrating subterranean formation comprising the steps of:
   a. introducing into the well a cementitious slurry comprising:
      a hydraulically-active cementitious material;
      substantially spherical zeolite; and
      water
   wherein the flexural strength to compressive strength ratio (FS/CS) of the slurry, when cured, is from about 0.29 to about 0.80; and
   b. allowing the slurry to set up in the well to provide zonal isolation in the well bore.

16. The method of claim 15, wherein the zeolite is porous.

17. The method of claim 15, wherein the compressive strength of the cementitious slurry, when cured is equal to or less than the compressive strength of a neat cementitious slurry containing no zeolite, when cured.

18. The method of claim 17, wherein the compressive strength of the cementitious slurry, when cured is at least 15% lower than the compressive strength of the neat cementitious slurry containing no zeolite, when cured.

19. The method of claim 15, wherein the zeolite is selected from the group consisting of natrolite, heulandite, analcime, chabazite, stilbite, and clinoptilolite.

20. The method of claim 15, wherein the FS/CS of the cement slurry, when cured, is at least 15% higher than a neat cementitious slurry containing no zeolite, when cured.

21. In a method of cementing downhole in a well bore in which a drilling fluid has been used to drill the well, the improvement comprising:
   a. introducing into the well a cementitious slurry comprising hydraulically-active cementitious material, substantially spherical zeolite and water, wherein the flexural strength to compressive strength ratio (FS/CS) of the slurry, when cured, is between from about 0.29 to about 0.80, the cement being less dense than the drilling fluid;
   b. activating the slurry;
   c. pumping the activated slurry into a pre-selected location within the well bore; and
   d. allowing the slurry to set up in the well to provide zonal isolation in the well bore.

22. A method of cementing an oil, gas, steam injection or geothermal well which comprises:
   a. introducing into the well a cementitious composition comprising a hydraulically-active cementitious material, substantially spherical zeolite and water wherein, when cured, the flexural strength and tensile strength of the cementitious composition are greater than the flexural strength mid tensile strength of a neat cementitious composition containing no zeolite when cured and further wherein the zeolite is selected from the group consisting of natrolite, heulandite, analcime, chabazite, stilbite, and clinoptilolite; and
   b. allowing the slurry to set up in the well.

23. In a method of cementing downhole in a well in which a drilling fluid has been used to drill the well the improvement comprising:
   a. introducing into the well a cementitious slurry comprising hydraulically-active cementitious material, substantially spherical zeolite and water, wherein the compressive strength of the cementitious slurry, when cured, is less than the compressive strength of a neat cementitious slurry not containing zeolite;
   b. activating the slurry;
   c. pumping the activated slurry into a pre-selected location within the well; and
   d. allowing the slurry to set up in the well.

24. The method of claim 23, wherein the zeolite is selected from the group consisting of natrolite, heulandite, analcime, chabazite, stilbite, and clinoptilolite.

25. A method of cementing an oil, gas, steam injection or geothermal well comprising the steps of:
   a. introducing into the well a cementitious composition comprising a hydraulically-active cementitious material, substantially spherical zeolite and water, wherein the flexural strength to compressive strength ratio (FS/CS) of the cementitious composition, when cured for sufficient time to be near its final compressive strength, is equal to or higher than the FS/CS ratio of a similar neat cementitious composition not containing zeolite, when cured under identical conditions: and
   b. allowing the cementitious composition to set up in the well to provide zonal isolation.

26. The method of claim 25, wherein the zeolite is selected from the group consisting of natrolite, heulandite, analcime, chabazite, stilbite, and clinoptilolite.

27. The method of claim 26, wherein die zeolite is clinoptilolite.

28. The method of claim 25, wherein the weight percent of zeolite in the cementitious composition is less than or equal to 15 percent.

29. The method of claim 28, wherein the weight percent of zeolite in the cementitious composition is less than or equal to 10 percent.

30. The method of claim 25, wherein the cementitious composition further comprises sand, silica powder and/or silica flour.

31. The method of claim 25, wherein the compressive strength of the cementitious composition, when cured, is lower than the compressive strength of a neat cementitious composition not containing zeolite, when cured, under identical conditions.

32. The method or claim 25, wherein the flexural strength of the cementitious slurry, when cured is higher than the flexural strength of a neat cementitious composition not containing zeolite, when cured, under identical conditions.

33. The method of claim 25, wherein the flexural strength to compressive strength ratio (FS/CS) of the cementitious composition, when cured, is between from about 0.29 to about 0.80.

34. The method of claim 25, wherein the zeolite is porous.

* * * * *

UNITED STATES PATENT AND TRADEMARK OFFICE
CERTIFICATE OF CORRECTION

PATENT NO. : 7,137,448 B2  Page 1 of 1
APPLICATION NO. : 10/744978
DATED : November 21, 2006
INVENTOR(S) : Di Lullo Arias et al.

It is certified that error appears in the above-identified patent and that said Letters Patent is hereby corrected as shown below:

Column 8, line 16, replace "cured," with --cured--

Column 8, line 20, replace "cementitious" with --cementing--

Column 9, line 33, replace "strength mid tensile" with --strength and tensile--

Column 9, line 40, replace "well the" with --well, the--

Column 10, line 16, replace "conditions:" with --conditions;--

Column 10, line 22, replace "die" with --the--

Signed and Sealed this

Twenty-sixth Day of June, 2007

JON W. DUDAS
*Director of the United States Patent and Trademark Office*